US007000054B2

(12) United States Patent
Kwong et al.

(10) Patent No.: US 7,000,054 B2
(45) Date of Patent: Feb. 14, 2006

(54) SWITCH FOR AN ELECTRONIC APPARATUS

(76) Inventors: Bill Kwong, 20363 Leutar Ct., Saratoga, CA (US) 95070; Victor Chuan-Chen Wu, 21055 Lauretta Dr., Cupertino, CA (US) 95014

( * ) Notice: Subject to any disclaimer, the term of this patent is extended or adjusted under 35 U.S.C. 154(b) by 334 days.

(21) Appl. No.: 10/197,851

(22) Filed: Jul. 19, 2002

(65) Prior Publication Data

US 2004/0015631 A1 Jan. 22, 2004

(51) Int. Cl.
*G06F 13/00* (2006.01)

(52) U.S. Cl. ........................ 710/302; 361/685; 439/43; 439/638

(58) Field of Classification Search ................ 710/302; 439/43, 638; 361/685
See application file for complete search history.

(56) References Cited

U.S. PATENT DOCUMENTS 6,526,515 B1 * 2/2003 Charles et al. .............. 713/300
6,553,433 B1 * 4/2003 Chang ......................... 710/15
6,560,099 B1 * 5/2003 Chang ......................... 361/685
6,618,788 B1 * 9/2003 Jacobs ........................ 710/315
2001/0003197 A1 * 6/2001 Matsushima et al. ......... 710/64
2003/0032333 A1 * 2/2003 Kwong ....................... 439/638
2003/0041203 A1 * 2/2003 Jones et al. ................. 710/301
2003/0079066 A1 * 4/2003 Pang ........................... 710/38
2003/0154340 A1 * 8/2003 Bolt et al. .................. 710/305

* cited by examiner

*Primary Examiner*—Glenn A. Auve
(74) *Attorney, Agent, or Firm*—Troxell Law Office, PLLC

(57) ABSTRACT

A smart switch design in an external data storage or a flash memory reader/writer application that controls a power on/off to both a data storage device and an electronic bridge board inside a interface cable, the external data storage including: an enclosure for protecting interior elements; a switch with first and second ends, the first end connected to a wire of the electronic bridge board for receiving a power signal from a computer via an interface cable, the second end is connected to a power signal pin of the data storage device and an ASIC of the electronic bridge board; when the switch turns on (or the flash memory card insert into said slot) the data storage device (or the flash memory card) and the ASIC of the electronic bridge board gets the power signal from the computer and automatically issues the necessary handshake signals to the computer to establish the electrical communication to the data storage device (or the flash memory card).

11 Claims, 6 Drawing Sheets

SWITCH FOR AN ELECTRONIC APPARATUS

BACKGROUND OF THE INVENTION

1. Field of the Invention

The present invention relates to a Smart Switch whereby the power to the bridge board is automatically turn on and off by the insertion or removal of the storage device from a drive bay or a flash memory reader/writer application in which the interface cable is permanently attached to the computer.

2. Description of Related Art

In many latest external data storage designs that connect to the computer IO ports, such as USB port or Firewire (IEEE 1394) port, of a computer, the connecting cable typically consists of both a cable and a small interface electronic circuit board, or called bridge board. When the connecting cable is plugged into the IO port of a computer or computing equipment, the bridge board immediately gets power directly from the IO port and automatically issues the necessary handshake signals to the computer to establish the electrical communication to the external data storage device. To remove the external storage device from the computer, the connecting cable is removed from the IO port, thus disconnecting the bridge board from the computer and terminating the handshake signals.

In many applications such as a remote storage attachment, drive bay (data storage bay), flash memory reader/writer, and so on, it is not practical to detach the interface cable from the IO port of the computer. Instead, the storage device is connected and disconnected from the computer by attaching and detaching the storage device from the connecting cable, or from the drive bay that is attached to the connecting cable. In the case of flash memory reader/writer, the storage media is inserted or removed from the drive that is attached to the connecting cable. In these types of applications, the bridge board is connected to computer at all time. In order for the computer to recognize the presence and absence of the data storage device or storage media, the power to the bridge board must be turned on and off accordingly so to terminate and re-initiate the handshake signals to the computer.

This invention provides a design, referred to as "Smart Switch", whereby the power to the bridge board is automatically turn on and off by the insertion or removal of the storage device from a drive bay or a flash memory reader/writer application in which the interface cable is permanently attached to the computer.

SUMMARY OF THE INVENTION

The object of the present invention is to provide a Smart Switch whereby the power to the bridge board is automatically turn on and off by the insertion or removal of the storage device from a drive bay or a flash memory reader/writer application in which the interface cable is permanently attached to the computer.

The smart switch design in the external data storage or a flash memory reader/writer application that controls the power on/off to both a data storage device and an electronic bridge board inside a interface cable, said external data storage comprising: An enclosure for protecting interior elements; a switch comprises two ends, first one connects to a wire of said electronic bridge board for getting a power signal from a computer via said interface cable, the other one connects to a power signal pin of said data storage device and a ASIC of said electronic bridge board; When the switch turns on (or said flash memory card insert into said slot) said data storage device (or said flash memory card) and said ASIC of said electronic bridge board gets the power signal from said computer and automatically issues the necessary handshake signals to said computer to establish the electrical communication to said data storage device (or said flash memory card).

BRIEF DESCRIPTION OF THE DRAWINGS

The present invention can be more fully understood by reference of the following description and accompanying drawings, in which.

DETAILED DESCRIPTION OF THE PREFERRED EMBODIMENTS

Figure 1:
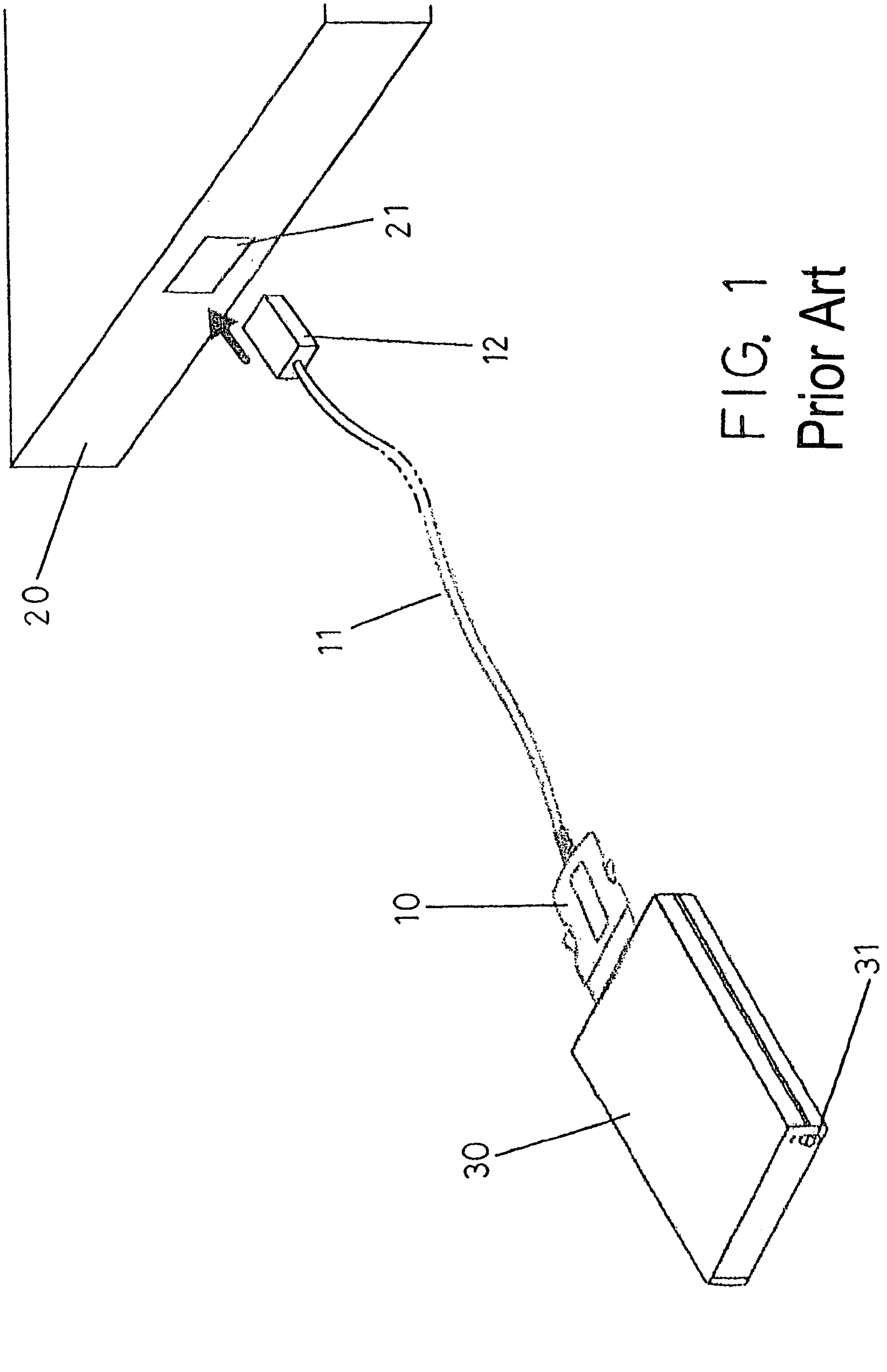
FIG. 1 Prior Art
FIG. 1 shows illustrates how a typical external storage is connected to a computer.

Referring to FIG. 1, which shows how a typical external storage 30 is connected to a computer 20. The external storage device 30 is connected to the interface cable 11. The interface cable 11 has a dongle 10, which contains an electronic bridge board to convert the IO port signal into the IDE signal for the external storage device, at one end and a small connector 12 on the other end. The dongle 10 is typically attached to the external storage device via a MC-36 male connector mounted on the dongle and a MC-36 female connector on the external storage device (The MC-36 connectors are not shown in the drawing for simplicity. A more detail design description and explanation of this type of interface cable can be found in the U.S. patent application, Ser. No. 09/911,450, filed Jul. 25, 2001 "Universal Storage Interface BUS"). By inserting and removing the connector 12 from the IO port 21 of the computer, the external storage device is connected and disconnected from the computer accordingly.

Figure 2:
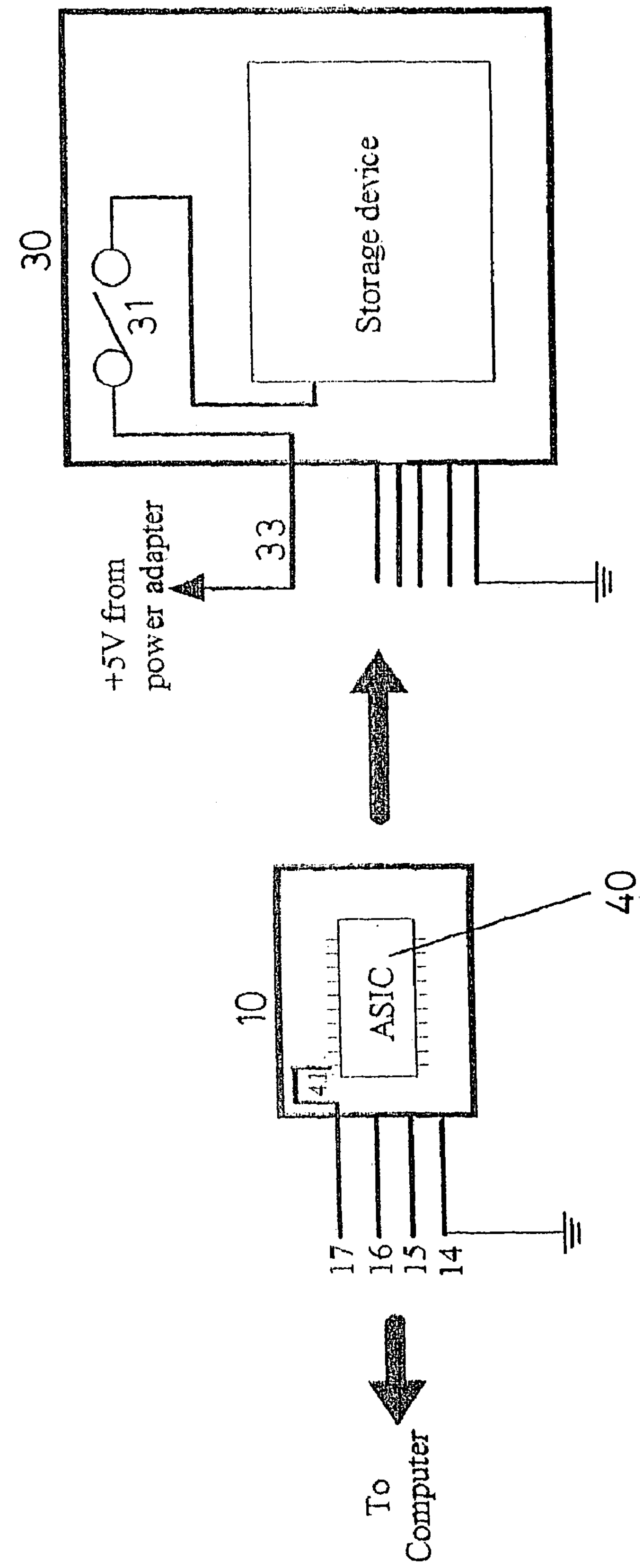
FIG. 2 Prior Art
FIG. 2 illustrate how the power is fed to a electronic bridge board inside the dongle 10 and the external storage device in a typical design of today's external storage design.
Figure 3:
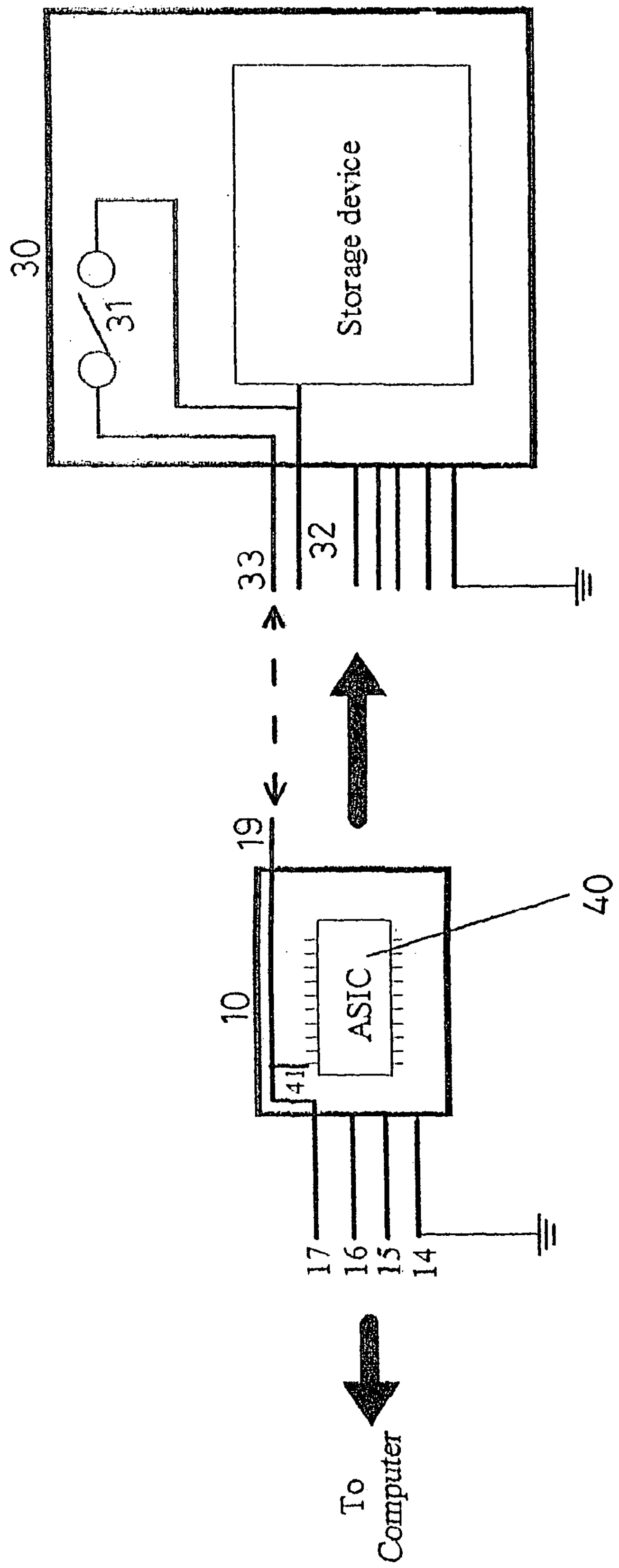
FIG. 3 Prior Art
FIG. 3 illustrates commonly called a BUS power design.

FIGS. 2 and 3 illustrate how the power is fed to a electronic bridge board inside the dongle 10 and the external storage device in a typical design of today's external storage design. The external storage device 30 can also be a flash memory reader/writer or a drive bay, similar in design as described in the U.S. patent application, Ser. No. 10/173,645, filed Jun. 14, 2002 "Console Drive".

FIG. 2 shows the +5V power flows from an external power adapter through connecting wire 33 to a power on/off switch 31 which connects to the power line of the storage device. For simplicity, the electronic bridge board inside the dongle 10 is represented by an ASIC 40. The connector 12 that inserts into the IO port, which is a USB port in this example, consists of 4 wires. When the interface cable is inserted into the USB port of the computer, +5V power will immediately flow through the wire 17 into the ASIC 40 via pin 41. Once the ASIC receives power, handshake signal is generated to communicate with the computer to established communication between the computer 20 and the external storage device 30.

FIG. 3 is commonly called a BUS power design. In this design, the +5V power from the IO port, besides feeding power to the ASIC 40, also feeds power to the external storage device via the wire 17 which also connects to the connecting wire 33 of the external storage device, when the dongle 10 attached to the external storage device 30.

In both FIGS. 2 and 3, power is supplied to the ASIC 40 inside the dongle of the interface cable at all time when the cable is connected to the computer. To fully disconnect the external storage device from the computer, the connector 12 must be removed from the IO port 21. If the external storage device is detached from the dongle 10 while leaving the connector 12 attached to the IO port 21, which is the case in the remote drive bay or flash reader/writer applications, the ASIC 40 will continued to get power from the IO port 21 and will wait for a response from the external storage device. The ASIC 10 eventually times out, leaving the USB interface cable inoperable. As a result, when a storage device is re-attached to the dongle, the computer no longer can reconfigure to reestablish communication with the external storage device.

Figure 4:
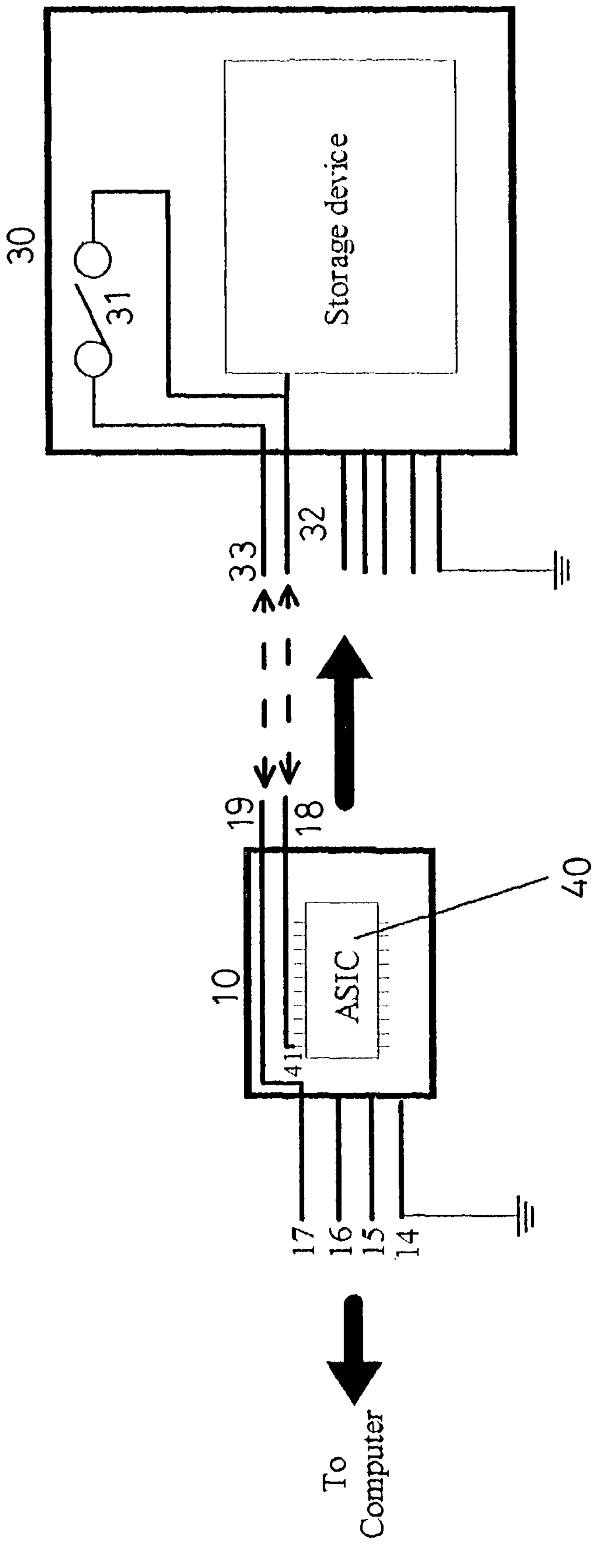
FIG. 4 illustrates the implementation of a Smart Switch to control both the power to the ASIC and the external storage device.

FIG. 4 illustrates the implementation of a Smart Switch to control both the power to the ASIC 40 and the external storage device 30. In this design, the power from the IO port, that flows through the connecting wire 17, is routed though the end of the dongle and is connected to the connecting wire 33 of the external storage device 30 when the dongle 10 is attached to the external storage device 30. Connecting wire 33 is connected to the on/off switch 31 which in turn connects to the power input of the storage device and the connecting wire 32 of the external storage device 30. The connecting wire 32 then feeds power back to the ASIC 40 via the connecting cable 18 of the dongle 10 when the dongle 10 is attached to the external storage device 30.

Using the design illustrated in FIG. 4, the power to the ASIC 40 and the external storage device 30 is turned on and off at the same time by the on/off switch 31. Likewise, if an external storage device 30 is detached from the end of the dongle 10, power to the ASIC 40 and the external storage device 30 is turned off immediately. So even the interface cable 11 is permanently attached to the computer, the power to ASIC 40 inside dongle 10 of the interface cable 11 will be shut off when the storage device is detached from the dongle 10 of interface cable 11, as in the case of a remote drive bay application, or when the storage media is removed from a flash memory reader/writer application.

Figure 5:
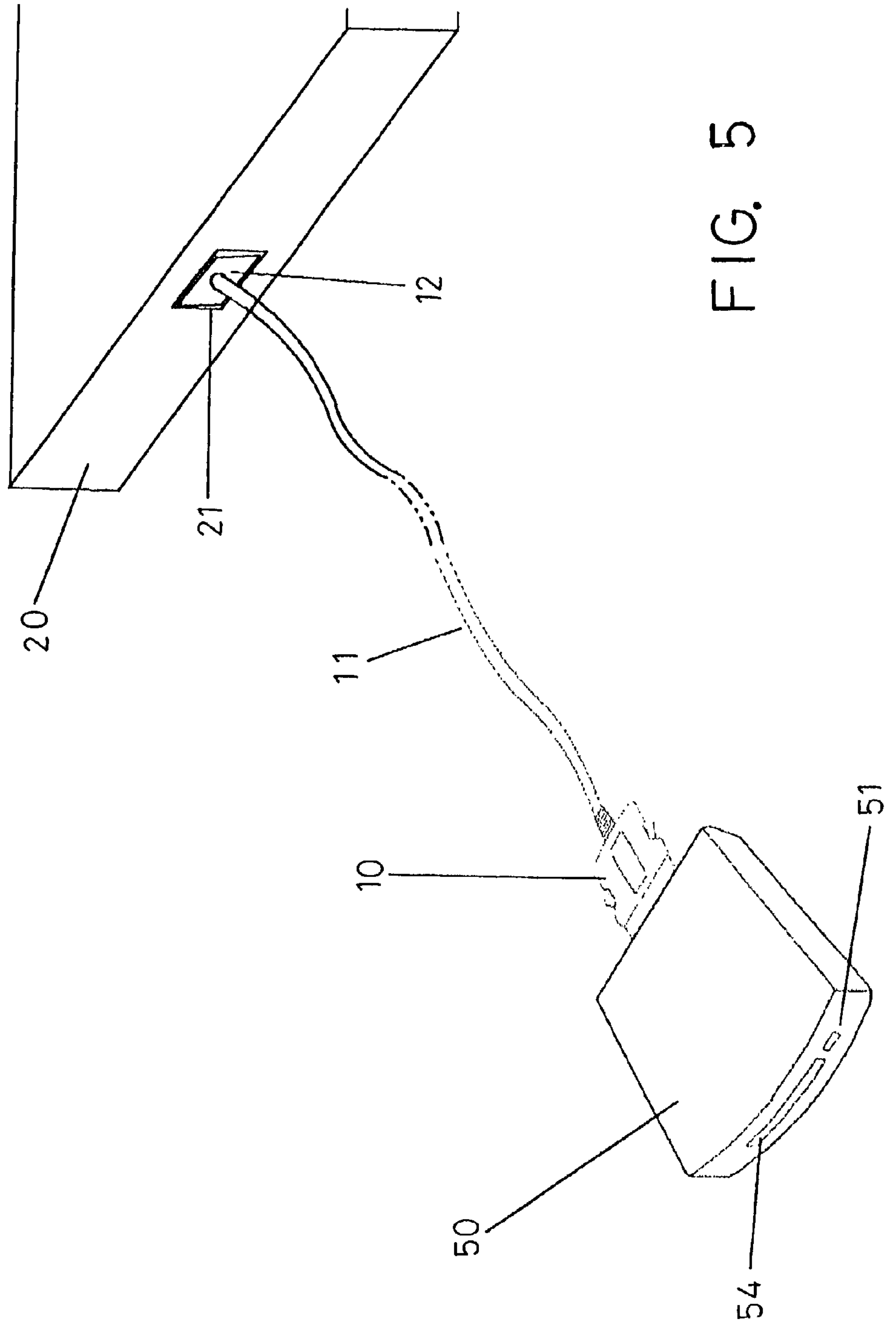
FIG. 5 illustrates a flash memory reader/writer design incorporated with Smart Switch.

FIG. 5 illustrate a flash memory reader/writer design incorporated with Smart Switch. In this illustration, the flash memory reader/writer 50 is attached to the dongle 10 of the interface cable 11. The connector 12 of the interface cable 11 is permanently attached to the IO port 21 of the computer 20. Flash memory or storage media is feed through PCMCIA slot 54 and can be ejected from the slot via the eject button 51.

Figure 6:
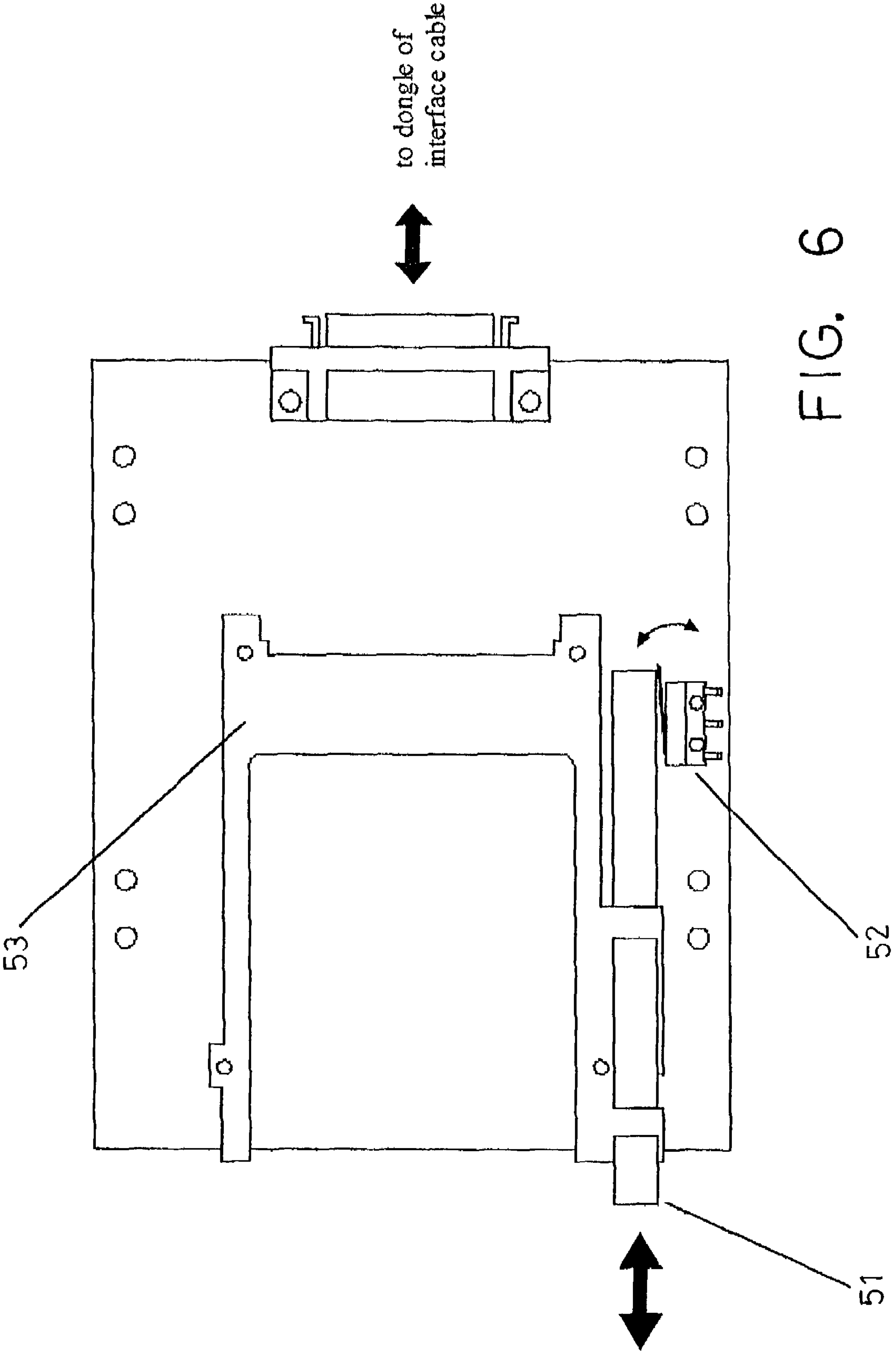
FIG. 6 illustrates shows the detail of the PCB construction inside the flash memory reader/writer.

FIG. 6 shows the detail of the PCB construction inside the flash memory reader/writer 50. It consists of a PCMCIA connector 53 and a micro switch 52 mounted in such a way that the micro switch can be turn on and off via the movement of the eject button 51 as storage media is inserted or ejected from the PCMCIA connector 53. In this design, the micro switch 53 provides the same power on/off function as the switch 31 in FIG. 4.

Although all the above descriptions were based on USB interface, the same principle applies to other 10 interfaces such as Firewire, Serial ATA or any future standard. While the invention has been disclosed with reference to preferred embodiments thereof, it is to be understood that modifications or variations may be easily made without departing from the spirit of this invention, which is defined in the appended claims.

What is claimed is:

1. A smart switch design in an external data storage application that controls the power on/off to both an external data storage device and a electronic bridge board inside a interface cable, said external data storage device comprising:

an enclosure for protecting interior elements;

a switch comprises two ends, a first end connected to a wire of an electronic bridge board receiving a power signal from a computer via said interface cable, a second end connected to a power signal pin of said external data storage device and an ASIC of said electronic bridge board;

wherein the switch turns on said external data storage device and said ASIC of said electronic bridge board gets the power signal from said computer and automatically issues predetermined handshake signals to said computer to establish the electrical communication to said external data storage device.

2. The smart switch design in the external data storage application according to claim 1, wherein said external data storage device is selectively connected to said computer by disconnecting and reconnecting said external data storage device from said interface cable.

3. The smart switch design according to claim 2, wherein said electronic bridge board is based on an IO interface selected from a group consisting of USB, Firewire, Serial ATA and PCMCIA.

4. The smart switch design in the external data storage application according to claim 1, wherein the power signal to said electronic bridge board of said interface board is turned on and off by attaching and detaching said external data storage device from said interface cable without removing said interface cable from an IO port of the computer.

5. The smart switch design according to claim 4, wherein said electronic bridge board is based on an IO interface selected from a group consisting of USB, Firewire, Serial ATA and PCMCIA.

6. The smart switch design according to claim 1, wherein said electronic bridge board is based on an IO interface selected from a group consisting of USB, Firewire, Serial ATA and PCMCIA.

7. The smart switch design in a remote drive bay application where the power to an electronic bridge board of an interface board is selectively turned on and off when a data storage device is inserted and removed from the remote bay without removing the interface cable from an IO port of a computer, said remote drive bay comprising:

an enclosure that slides in and out of a tray of the computer for containing said data storage device and including a switch having first and second ends, the first end is connected to a wire of said electronic bridge board receiving a power signal from said computer via said interface board, the second end is connected to a power signal pin of said data storage device and an ASIC of said electronic bridge board;

wherein the data storage device is selectively inserted and removed from the drive bay, when the data storage device is inserted into the drive bay said data storage device and said ASIC of said electronic bridge board receives the power signal from said computer and automatically issues predetermined handshake signals to said computer to establish the electrical communication to said data storage device.

8. The smart switch design according to claim 7, wherein said electronic bridge board is based on an IO interface selected from a group consisting of USB, Firewire, Serial ATA and PCMCIA.

9. A smart switch design in a flash memory reader/writer application where the power to an electronic bridge board of an interface board is selectively turned on and off when a data storage media is inserted and ejected from the reader/writer without removing an interface cable from an IO port of the a computer, said flash memory reader/writer comprising:

an enclosure protecting interior elements;

a connector connected to a dongle of said electronic bridge board;

a slot containing a flash memory card;

a switch comprises first and second ends, the first end is connected to a wire of said connector receiving a power signal from said computer via said interface board, the second end is connected to a power signal pin of a slot and an ASIC of said electronic bridge board; and an eject button for ejecting said flash memory card from said slot.

10. The smart switch design in the flash memory reader/writer according to claim 9, wherein said slot is a PCMCIA slot.

11. The smart switch design according to claim 9, wherein said electronic bridge board is based on an IO interface selected from a group consisting of USB, Firewire, Serial ATA and PCMCIA.

* * * * *